June 7, 1949.  W. W. NASH  2,472,170
MEANS FOR SUPPLYING LUBRICATION AS A FINE MIST
Filed Aug. 18, 1944
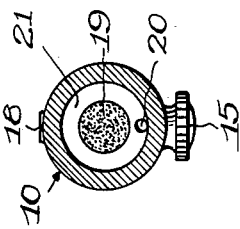
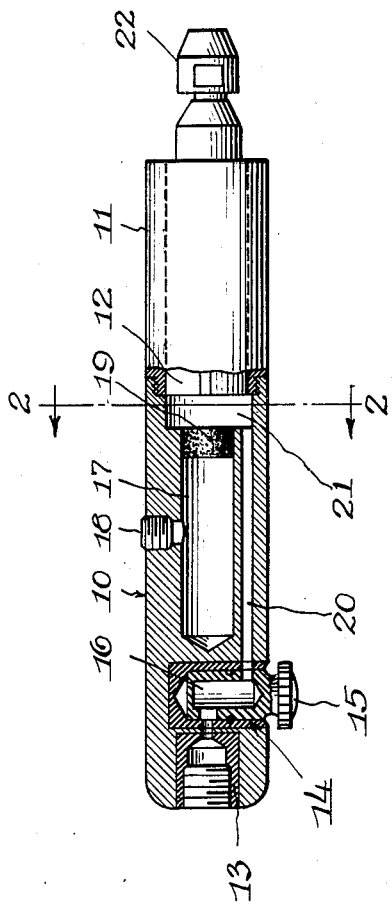
INVENTOR.
William W. Nash Patented June 7, 1949

2,472,170

UNITED STATES PATENT OFFICE 2,472,170

MEANS FOR SUPPLYING LUBRICATION AS A FINE MIST

William W. Nash, Salem, Wis., assignor to The Dumore Company, Racine, Wis., a corporation of Wisconsin Application August 18, 1944, Serial No. 550,016

2 Claims. (Cl. 184—55)

This invention relates to means for supplying lubrication as a fine mist.

To conveniently illustrate one use of the invention, the drawing shows the housing of a gas motor. By the term "gas motor" is meant a motor which operates by a compressed gas such as air. Such motors have parts rotating at such a high speed that the oil supplied by previously known lubricating means is thrown off of the parts in comparatively large drops by the centrifugal force developed. Therefore, a most important consideration in providing an oiling system for a motor of this type is to introduce the oil into the gas stream in as finely divided state as possible.

As shown in the application of my invention to a gas motor housing, the housing is provided with an oil reservoir therein, and a gas port is arranged to discharge gas past said reservoir and pick up the lubricant in the form of a fine mist, which is carried into the gas motor to lubricate its rotatable parts.

In prior devices the end of the reservoir was closed by a plug having a small orifice or port past which the air flowed to draw out a small quantity of lubricant and deliver it to the operating mechanism. To prevent too much leakage of oil through said orifice the latter had to be quite small and in any case the oil supplied thereby was concentrated at a particular outlet. This prior art structure does not break the oil up into a mist.

One object of my invention is to provide a means for supplying oil from an extended surface or wall on a closure of porous material, to insure a small supply in the form of a mist when a slight suction is applied to said porous wall.

Another object is to provide an oil reservoir of this character with a porous end wall through which the lubricant may be caused to pass through a large number of very small holes provided by the porous wall at a very slow rate under the slight vacuum produced by the flow of an air stream over its surface.

An additional object is to provide an oil reservoir with a porous wall which for all practical purposes constitutes a sufficiently tight closure to prevent leakage of oil when the latter is not required.

A further object is to avoid the necessity of providing one or more very small holes in the wall of the reservoir.

In the drawings

Fig. 1 is an elevation partly in section of the housing or handle of a pneumatic tool;

Fig. 2 is a section on the line 2—2 thereof.

The housing or handle 10 is part of a small pneumatic tool, such for example, as a gas motor, on the spindle of which may be mounted a small grinding wheel or other tool. Said handle may be made in two sections, one of which comprises a detachable portion 11 in which the gas motor 12 is mounted. This gas motor is not described as it forms no part of the present invention.

Said housing section 10 is made preferably of translucent material. It has a metal insert 13 at one end in the form of a threaded sleeve to which a gas hose may be attached and adjacent the same is a valve designated as a whole by 14 and having a knurled knob 15 mounted on a rotatable hollow spindle 16 to regulate the flow of air.

A reservoir 17 is provided for a lubricant which is introduced through an opening normally closed by a screw plug 18. Said reservoir has a closure 19 at one end in the form of a plug of porous metal, preferably sintered iron, commonly known as "powdered iron" which is porous to the extent of approximately 25% of its volume.

An air port 20 is provided in the handle and extends from the valve 14 to a clearance space 21 adjacent the plug 19. Air flows through this port and over the surface of the disk-like closure 19 and then to the rotor of the gas motor 12, on the shaft of which a small chuck 22 may be mounted.

The porous plug 19 absorbs a certain amount of oil and the gas flowing over the surface thereof produces a partial vacuum. The slight suction tends to draw oil to the surface of said porous plug from which it is carried on by the stream of gas in the form of a fine mist diffused throughout said stream and hence available for providing lubrication to all of the moving parts over which the gas flows. The suction also results in drawing more oil into the multitude of orifices in the end closure to replace that which is drawn off in the form of a mist. However, the oil works its way through the porous closure slowly and practically only when suction is supplied, so that under normal conditions when no gas is flowing rapid leakage of the oil out of the reservoir is prevented.

The translucent material of which the handle or housing is made makes it possible to check the oil level in said reservoir.

I have found that a gas motor provided with a lubricating device of the type herein described, can be operated at speeds considerably in excess of the maximum speeds recommended for gas motors having a drilled wall.

Although I have shown and described only a preferred form of my invention, it will be understood that various modifications and changes may be made in the construction shown without departing from the spirit of my invention. The foregoing description and drawings are illustrative only and my invention is to be limited only by the following claims.

I claim:

1. A pneumatic tool housing comprising a section of translucent material, an air actuated motor embodying high speed rotating parts disposed in one part of said housing, a valve in said housing, a duct between said valve and said tool said duct including a passageway of comparatively small cross section and a chamber, and a reservoir having a wall of sintered iron closing one end of the same and forming a wall portion of said chamber whereby air flowing over said wall becomes charged with an oily mist.

2. A housing for a gas operated tool, one end of which housing is provided with a bore of reduced diameter and a counter bore forming a chamber, a plug of sintered iron fitted into the open end of said bore and separating said bore from said chamber, and a passageway disposed parallel to said bore and opening into said chamber at a point substantially adjacent to the surface of said plug, whereby gas introduced under pressure through said passageway and into said chamber will cause a lubricating liquid contained in said bore to be drawn through said porous plug and to be introduced into said chamber in the form of a fine mist.

WILLIAM W. NASH.

REFERENCES CITED

The following references are of record in the file of this patent:

UNITED STATES PATENTS

| Number | Name | Date |
|---|---|---|
| 1,195,349 | Gates | Aug. 22, 1916 |
| 2,111,583 | De Mooy | Mar. 22, 1938 |
| 2,297,817 | Truxell et al. | Oct. 6, 1942 |
| 2,364,894 | Finch | Dec. 12, 1944 |
| 2,308,773 | Norgren et al. | Jan. 19, 1943 |